US011825369B2

(12) United States Patent
Lin

(10) Patent No.: US 11,825,369 B2
(45) Date of Patent: Nov. 21, 2023

(54) HANDOVER IN A SYSTEM WITH IAB

(71) Applicant: ORANGE, Issy-les-Moulineaux (CN)

(72) Inventor: Hao Lin, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 80 days.

(21) Appl. No.: 17/268,765

(22) PCT Filed: Aug. 5, 2019

(86) PCT No.: PCT/FR2019/051903
§ 371 (c)(1),
(2) Date: Feb. 16, 2021

(87) PCT Pub. No.: WO2020/035645
PCT Pub. Date: Feb. 20, 2020

(65) Prior Publication Data
US 2021/0329520 A1    Oct. 21, 2021

(30) Foreign Application Priority Data
Aug. 16, 2018   (FR) ...................................... 1857510

(51) Int. Cl.
*H04W 36/12*   (2009.01)
*H04W 36/00*   (2009.01)
(52) U.S. Cl.
CPC ....... *H04W 36/12* (2013.01); *H04W 36/0061* (2013.01); *H04W 36/00837* (2018.08)
(58) Field of Classification Search
CPC ......... H04W 4/00; H04W 8/00; H04W 16/00; H04W 24/00; H04W 28/00; H04W 36/00;
(Continued)

(56) References Cited

U.S. PATENT DOCUMENTS 6,151,314 A * 11/2000 Rauhala ................ H04L 49/254
370/392
11,477,712 B2 * 10/2022 Hsieh ................ H04W 36/0055
(Continued)

FOREIGN PATENT DOCUMENTS

WO   2008/114180 A2   9/2008
WO   2013/091678 A1   6/2013

OTHER PUBLICATIONS

U.S. Appl. No. 62/715,948 (Year: 2018).*
(Continued)

*Primary Examiner* — Joseph E Avellino
*Assistant Examiner* — Mon Cheri S Davenport
(74) *Attorney, Agent, or Firm* — David D. Brush; Westman, Champlin & Koehler, P.A.

(57) ABSTRACT

A method for handover between base stations of an access system for access to a core network including interconnections in a tree structure having wireless links and a single wired link. The wired link connects only one of the base stations, known as a donor node, to the core network. The interconnections between the base stations are solely wireless links. The method includes: transmitting, by a source base station of the access system, to which a terminal is attached, a handover request to a target base station of the access system, the source and target base stations being interconnected via at least one base station known as a decision-making node, which is different from the donor node; intercepting the handover request by the decision-making node; transmitting, by the decision-making node, an agreement message to the source base station; and transmitting a handover trigger message to the target base station.

9 Claims, 3 Drawing Sheets

Figure 1:
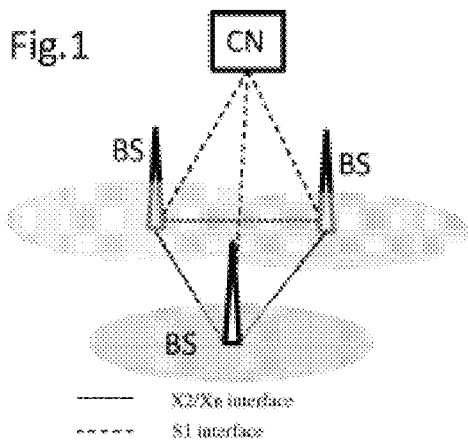

(58) Field of Classification Search
CPC ..... H04W 40/00; H04W 48/00; H04W 52/00; H04W 56/00; H04W 60/00; H04W 64/00; H04W 68/00; H04W 72/00; H04W 76/00; H04W 74/00; H04W 80/00; H04W 84/00; H04W 92/00; H04W 99/00; H04L 47/27; H04Q 11/0478

See application file for complete search history.

(56) References Cited

U.S. PATENT DOCUMENTS

| | | | | |
|---|---|---|---|---|
| 2016/0100338 A1* | 4/2016 | Wu | .................. | H04W 36/0022 370/331 |
| 2017/0055187 A1* | 2/2017 | Kang | ................ | H04W 36/0069 |
| 2019/0394084 A1* | 12/2019 | Tsai | .................. | H04W 36/0079 |
| 2020/0053629 A1* | 2/2020 | Majmundar | ........ | H04W 36/023 |
| 2021/0160735 A1* | 5/2021 | Fujishiro | ........... | H04W 36/0055 |
| 2021/0227435 A1* | 7/2021 | Hsieh | .................... | H04W 36/08 |
| 2021/0250817 A1* | 8/2021 | Zou | .................... | H04W 36/0005 |
| 2021/0274394 A1* | 9/2021 | Luo | .................... | H04W 36/0016 |
| 2021/0352566 A1* | 11/2021 | Majmundar | ...... | H04W 36/0061 |

OTHER PUBLICATIONS

International Search Report dated Oct. 16, 2019 for corresponding International Application No. PCT/FR2019/051903, dated Aug. 5, 2019.

Written Opinion of the International Searching Authority dated Oct. 16, 2019 for corresponding International Application No. PCT/FR2019/051903, filed Aug. 5, 2019.

ZTE., "Discussion on IAB node access procedure", vol. RAN WG2, No. Busan, Korea; May 21, 2018-May 25, 2018, May 20, 2018 (May 20, 2018), 3GPP Draft; R2-1807401—Discussion on IAB Node Access Procedure, 3rd Generation Partnership Project (3GPP), Mobile Competence Centre; 650, Route Des Lucioles; F-06921 Sophia-Antipolis Cedex; France, Retrieved from the Internet: http://www.3gpp.org/ftp/Meetings%5F3GPP%5FSYNC/RAN2/Docs/ [retrieved on May 20, 2018], XP051443798.

"3rd Generation Partnership Project; Technical Specification Group Radio Access Network; Study on Integrated Access and Backhaul; (Release 15)" 3GPP Standard; Technical Report; 3GPP TR 38.874, 3rd Generation Partnership Project (3GPP), Mobile Competence Centre; 650, Route Des Lucioles; F-06921 Sophia-Antipolis Cedex; France, vol. RAN WG2, No. V0.4.0, Aug. 9, 2018 (Aug. 9, 2018), pp. 1-55, XP051475113.

ZTE., "Discussion on IAB topology adaptation", vol. RAN WG2, No. Montreal, Canada, Jul. 1, 2018 (Jul. 1, 2018), 3GPP Draft; R3-183688—Discussion on IAB Topology Adaptation, 3rd Generation Partnership Project (3GPP), Mobile Competence Centre; 650, Route Des Lucioles; F-06921 Sophia-Antipolis Cedex; France, Retrieved from the Internet: http://www.3gpp.org/ftp/Meetings%5F3GPP%5FSYNC/RAN3/Docs/ [retrieved on Jul. 1, 2018], XP051467976.

English translation of the Written Opinion of the International Searching Authority dated Nov. 18, 2019 for corresponding International Application No. PCT/FR2019/051903, filed Aug. 5, 2019.

* cited by examiner

HANDOVER IN A SYSTEM WITH IAB

CROSS-REFERENCE TO RELATED APPLICATIONS

This Application is a Section 371 National Stage Application of International Application No. PCT/FR2019/051903, filed Aug. 5, 2019, which is incorporated by reference in its entirety and published as WO 2020/035645 A1 on Feb. 20, 2020, not in English.

FIELD OF THE INVENTION

The field of the invention is that of cellular communications. More specifically, the invention relates to access to the transmission channel of an access network whose nodes are connected by a wired link to a core network either directly for only one of the nodes or via wireless links between the nodes up to that one node.

PRIOR ART

The access network of a telecommunications system comprises nodes known as base stations in a cellular communications context.

The specifications of the LTE-Advanced system published by 3GPP specify the interconnection architecture between the base stations of the access network and the core network, known as the framework of interconnections (backhaul). FIG. 1 schematically illustrates this architecture. According to the diagram, the base stations BS are interconnected with one another via a wired interface known as an X2 interface, and each base station BS is connected to the core network CN via a wired interface known as an S1 interface.

Different communication scenarios between two terminals with movement of one or both terminals define the requirements to be met by the access network to ensure the continuity of communications despite the mobility of the terminals.

To ensure this continuity, one of the mechanisms specified is the switching mechanism known as handover.

Figure 2:
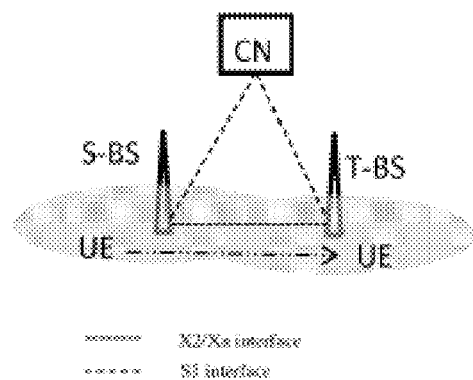

With reference to FIG. 2, a handover mechanism is based on the exchange of messages between the base station to which the terminal UE is attached, known as the source base station S-BS, and the base station to which the terminal UE is to be attached, known as the target base station T-BS.

Figure 3:
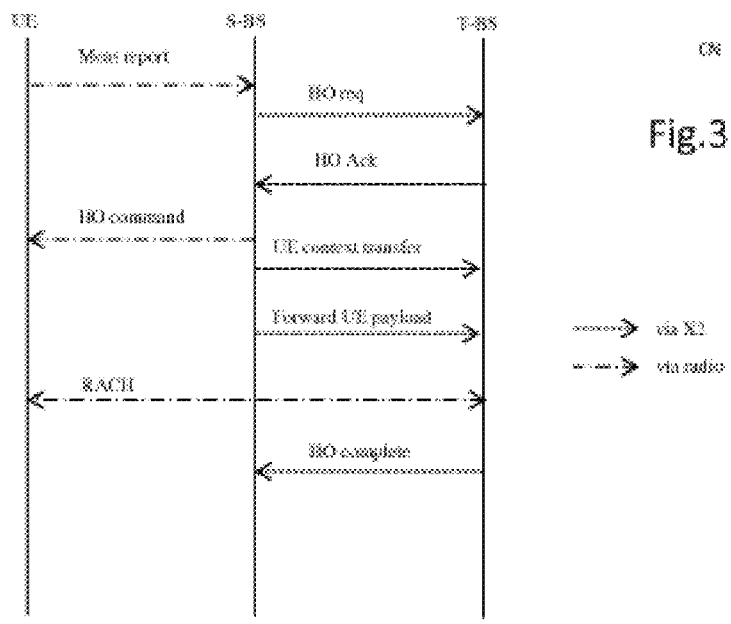

The messages exchanged are illustrated by FIG. 3 with reference to a known handover mechanism specified, for example, for a 3GPP LTE-Advanced system in versions 10 (release 10) onwards.

The source base station S-BS decides to trigger a handover mechanism on the basis of measurements, Meas report, reported to it by the terminal UE. The decision criteria relate to the radio signal level and/or quality of the neighboring cells measured by the terminal UE.

The triggering results in the source base station S-BS sending a request message, HO req, to the target base station T-BS via the X2 interface. This request essentially consists in interrogating the target base station T-BS regarding the possibility of carrying out the handover.

The target base station T-BS checks the resources available for transmitting and receiving the data of the terminal UE in the event of an actual handover of the terminal UE.

If the target base station T-BS accepts the handover, it responds to the source base station S-BS with an agreement message, HO Ack. This agreement message must comprise the information required for the implementation of the handover: for example the configuration of the logical and transport channels, and in particular the identification of the time-frequency resource for random access (RACH channel), a new C-RNTI identity value, a security identifier, and possibly a dedicated preamble.

On receipt of this agreement message, HO Ack, the source base station S-BS triggers a handover command, HO command, destined for the terminal UE. This command is typically an RRC message, via the radio channel, which informs (C-RNTI identifier, time-frequency resource, preamble, etc.) the terminal UE of the target base station T-BS.

In parallel, the source base station S-BS transfers to the target base station T-BS, via the X2 interface, connection context information for the terminal UE, UE context transfer, which comprises terminal-specific information (security information, etc.) relating to high layers (according to the OSI model) so that the target base station can receive data from the core network that are destined for the terminal. The source base station S-BS transfers to the target base station T-BS, via the X2 interface, specific data for the terminal UE, Forward UE payload, which the source base station S-BS has not yet transmitted to it.

As soon as the terminal UE receives the handover command, HO command, it starts a random access procedure for accessing the target base station T-BS on the RACH channel. The RACH channel can be accessed with the dedicated preamble, if it has been provided. On completion of this method, the terminal UE is attached to the target base station T-BS, which then becomes the source base station S-BS if a new handover has to take place subsequently. When the terminal UE is attached to the target base station T-BS, the latter informs the source base station S-BS of the end of the handover method, HO complete.

Given the proliferation of multimedia content offerings and applications to access them, the bandwidth and bit rate requirements for the access network are ever higher.

Within the 3GPP standards organization, work is underway to allow the implementation of scenarios with requirements in terms of bit rate and bandwidth that the system known as LTE-Advanced cannot meet.

One architecture envisaged within 3GPP comprises a framework of interconnections with wireless links (wireless backhaul) between the nodes to meet the needs of certain scenarios while ensuring flexibility and allowing dense deployment of cells without the need for proportional densification of the interconnections. The corresponding system is known as an IAB system.

Figure 4:
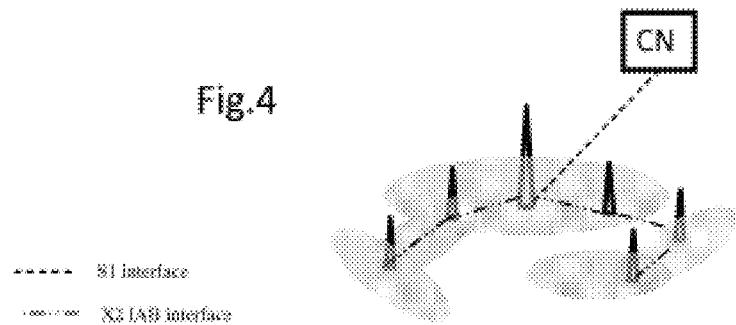

Thus, in IAB systems, only a node known as the donor node is directly connected to the core network CN via the S1 interface (wired interface). The interconnections between the nodes are based on a radio transmission via a wireless interface known as X2 IAB (wireless interface) as illustrated by FIG. 4.

During movement of a terminal UE in an IAB system, a handover procedure must be able to be implemented to ensure the continuity of a communication of the terminal UE established via the IAB system.

Figure 5:
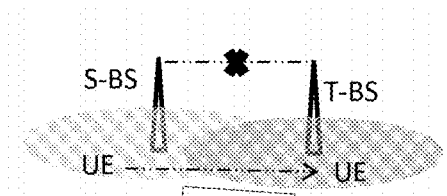

Depending on the location of the IAB nodes and the configuration of the framework of wireless interconnections of the IAB system, the source base station S-BS and the target base station T-BS may not be interconnected by a direct wireless link FIG. 5 is a diagram illustrating such a configuration, where the source base station S-BS and the target base station T-BS are not interconnected by a direct wireless link.

Figure 6:
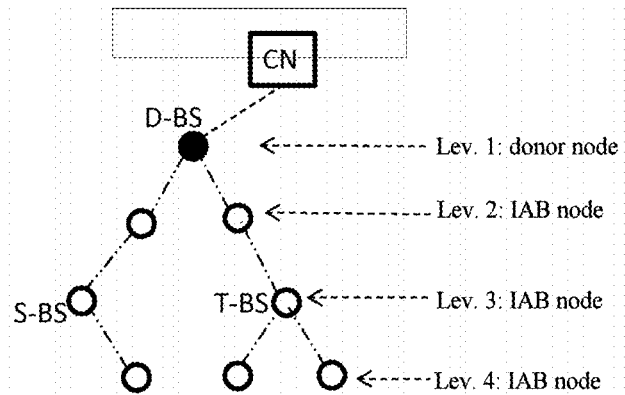

FIG. 6 is a schematic representation, in a tree structure, of an IAB system. The donor node D-BS is the only one connected by a wired connection to the core network CN. This donor node is connected by a direct wireless connection to nodes which are known as the level 2 child nodes thereof; the donor node defines level 1 and is the parent node of these level 2 nodes. Each of the level 2 nodes is itself the parent node of level 3 nodes which are connected directly thereto by a wireless link, and so on. At each level, a node, other than the donor node, has a parent node and one or more child nodes, except the lowest-level nodes known as edge nodes (level 4 nodes according to the example), which have only a parent node and no child node. The depiction of a link between two child nodes means that each of these two nodes is within the radio coverage of the X2 interface of the other node. The absence of any depicted link between two child nodes means that each of these two nodes is outside the radio coverage of the X2 interface of the other node, as is the case for the nodes S-BS and T-BS, which correspond to the nodes of FIG. 5.

Consequently, when the handover method has to be implemented between two nodes, each of which is outside the radio coverage of the X2 interface of the other node, the messages cannot be exchanged directly between these two nodes via their X2 IAB interface. The handover messages transmitted by one of the nodes must be passed up to a first common parent node in the tree structure before being able to be passed down to the other node. According to the example illustrated by FIG. 6, the first common parent node is the donor node D-BS.

Such a path significantly extends the latency of the handover method.

Figure 8:
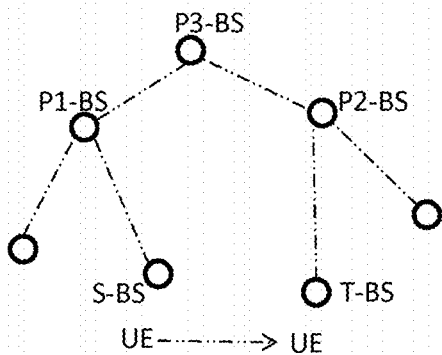
Figure 7:
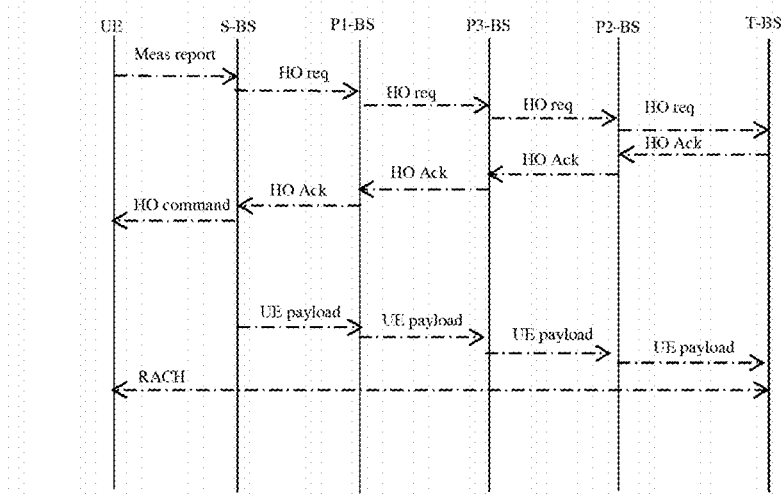

FIG. 7 shows the handover messages of FIG. 3 in the case of a configuration of the IAB system illustrated by FIGS. 5 and 8. The transmission of the connection context information for the terminal UE, UE context transfer, from the source base station S-BS to the target base station T-BS via the X2 interface no longer appears in FIG. 7. This is because, according to the known mechanism illustrated by FIGS. 2 and 3, the source base station S-BS and target base station T-BS are each connected via their S1 interface to the core network CN. After the handover, the core network CN delivers the data destined for the terminal UE along a path which still uses an S1 interface, but this interface is different from the one before the handover. Therefore, the source base station S-BS must transfer the connection context for the terminal UE to the target base station T-BS via the X2 interface.

In the case of a configuration of an IAB system, the handover occurs between two nodes which are dependent on a single donor node, since there is only one donor node. Consequently, from the point of view of the core network CN, this means that the data destined for the terminal are transmitted along a path which always uses the same S1 interface. Thus, there is no longer any need to transfer the connection context information for the terminal UE from the source base station S-BS to the target base station T-BS.

FIG. 8 is a schematic representation, in a tree structure, of an IAB system with identification only of the wireless links between the nodes, the core network not being depicted. The illustrated IAB system comprises nodes without a direct wireless link, known as edge nodes. A terminal UE is connected to a source base station S-BS. This terminal UE is mobile and moving. On the basis of the radio measurements that it reports to its source base station S-BS, one of the stations in the IAB system is identified as the target base station T-BS. According to this example, the first common parent node of the source base station S-BS and of the target base station T-BS is the node P3-BS. Indeed, the node P1-BS is the first parent node of the source base station S-BS, and the node P2-BS is the first parent node of the target base station T-BS, but these nodes P1-BS and P2-BS are different. However, these two nodes P1-BS and P2-BS have the same parent node P3-BS.

The comparison of FIGS. 3 and 7 reveals that the path of the messages is no longer implemented directly between the stations S-BS and T-BS, but is implemented by multiple hops between the nodes S-BS and P1-BS, between the nodes P1-BS and P3-BS, between the nodes P3-BS and P2-BS, and between the nodes P2-BS and T-BS. These multiple hops significantly extension the path of the messages and therefore the latency of the handover method.

DISCLOSURE OF THE INVENTION

The context of the invention is that of an IAB access system. An IAB access system comprises a framework of interconnections such that only one interconnection link is of the wired type, the other interconnections being of the wireless type. The wired link connects only one of the base stations of the access network to the core network; this station is known as the donor node. All the other interconnections are between the base stations of the access network and are based on wireless links.

The invention proposes a method for handover between base stations of an IAB access system for access to a core network, which does not have the drawback of the prior art.

The handover method comprises:
transmission, by a base station known as the source base station of the access system, to which base station a terminal is attached, of a handover request to a base station known as the target base station of the access system, the request comprising an identifier of the source and target base stations, respectively, and an identifier of the terminal.

The source and target base stations being interconnected via at least one base station known as the decision-making node, which is different from the donor node, the method further comprises:
interception of the handover request by the decision-making node,
transmission, by the decision-making node, of a determined agreement message to the source base station,
transmission of a handover trigger message to the target base station.

The invention is based on the identification of base stations known as decision-making base stations in the interconnection topology, which base stations can make the handover decision in place of the target base station and upstream of the latter in the topology, which leads to a reduction in the number of multiple hops constituting the path taken by the handover messages.

Thus, for a pair of source and target base stations which are not directly interconnected, known as edge stations, a parent base station common to these two source and target base stations is identified in the topology. Eliminating multiple hops from the path of the handover messages advantageously reduces the latency of the handover method.

According to a particular embodiment, the method further comprises identification, by the decision-making node, of the determined agreement message by querying a list of agreement messages on the basis of the identifier of the target base station included in the handover request.

According to a particular embodiment, the decision-making node transfers, to the target base station, data from the core network that are destined for the terminal and have not yet been transmitted to the source base station.

When the handover decision is made, i.e. the agreement is transmitted to the source base station, the donor node temporarily stores the data that come from the core network via the donor node and are destined for the terminal. After having transmitted the handover trigger message to the target base station, the donor node transfers the temporarily stored data to the target base station.

A subject of the invention is also a base station, known as a decision-making node, intended for an access system for access to a core network that comprises a framework of interconnections in a tree structure comprising wireless links and a single wired link, the wired link connecting only one of the base stations of the access system to the core network, this station being known as the donor node, the interconnections between the base stations of the access system being based solely on wireless links. This decision-making node comprises:
   a wireless connection interface for receiving and transmitting messages transmitted respectively from and to another base station of the access system,
   a memory for storing the tree structure,
   a memory for storing a list of determined agreement messages identified respectively with identifiers of the base stations,
   a processor for intercepting a handover request received on the wireless connection interface and transmitted by a base station known as the source base station of the access system, to which base station a terminal is attached, to a base station known as the target base station of the access system, the request comprising an identifier of the source and target base stations, respectively, and an identifier of the terminal,
   a processor for controlling the memory in order to transmit, via the wireless connection interface, a determined agreement message to the source base station,
   a processor for controlling the memory in order to transmit, via the wireless connection interface, a handover trigger message to the target base station.

LIST OF THE FIGURES

Figure 9:
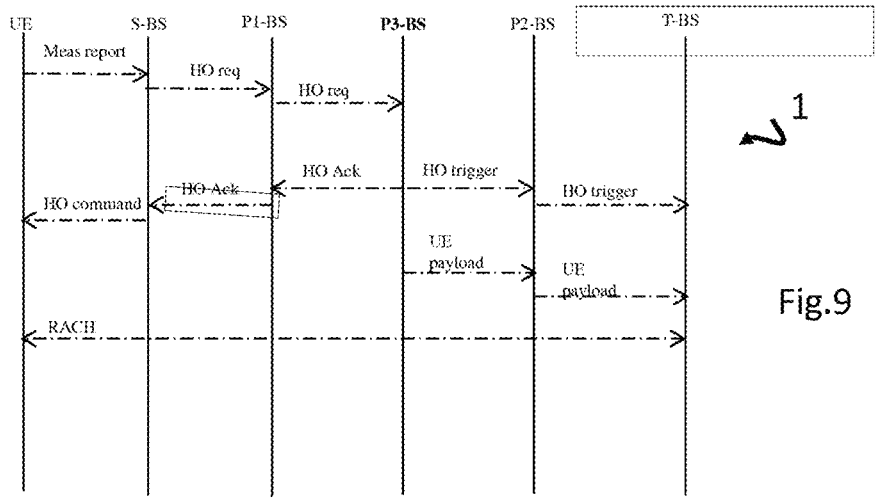
Figure 10:
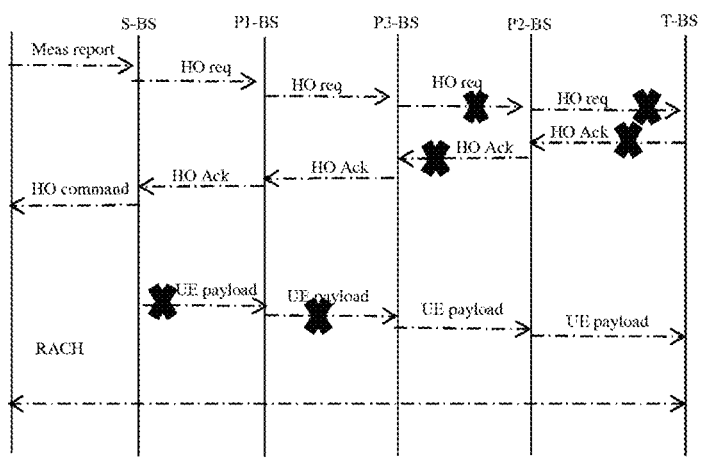
Figure 11:
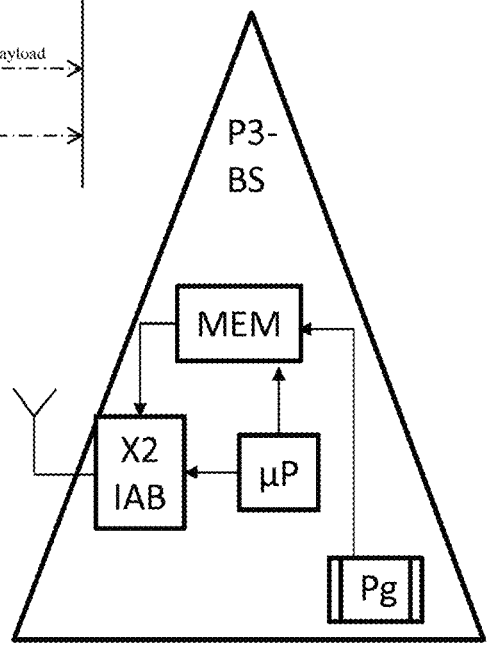

Other features and advantages of the invention will become more clearly apparent upon reading the following description of particular embodiments, provided by way of simple illustrative and nonlimiting examples, and the appended drawings, in which:

FIG. 1, which has already been discussed in relation to the prior art, is a diagram illustrating an access system for access to a core network CN with a framework of wired interconnections, FIG. 2, which has already been discussed in relation to the prior art, is a diagram illustrating a moving terminal UE, which is connected via the access system of FIG. 1, FIG. 3, which has already been discussed in relation to the prior art, is a diagram of the messages exchanged for the handover of the terminal UE between the source base station S-BS and the target base station T-BS, FIG. 4, which has already been discussed in relation to the prior art, is a diagram illustrating an IAB access system for access to a core network CN with a framework of wireless and wired interconnections, FIG. 5, which has already been discussed in relation to the prior art, is a diagram depicting a terminal UE moving between a source base station S-BS and a target base station T-BS of the IAB access system of FIG. 3, the two source S-BS and target T-BS stations not being directly interconnected by a wireless link, FIG. 6, which has already been discussed in relation to the prior art, is a diagram of the tree structure of an IAB access system with identification of the wired link between the donor node D-BS and the core network CN and of the wireless links between all the nodes, FIG. 7, which has already been discussed in relation to the prior art, is a diagram of the messages exchanged for the handover of the terminal UE between the source base station S-BS and the target base station T-BS of the IAB system whose tree structure is that of FIG. 8, FIG. 8, which has already been discussed in relation to the prior art, illustrates the tree structure of an IAB access system with identification only of the wireless links between all the nodes and of the source base station S-BS and target base station T-BS of a moving terminal UE, FIG. 9 is a diagram of the messages exchanged for the handover of the terminal UE between the source base station S-BS and the target base station T-BS of the IAB system whose tree structure is that of FIG. 8, according to the invention, FIG. 10 is the diagram of FIG. 9, to which crosses signifying the elimination of certain hops have been added, FIG. 11 is a diagram of a simplified structure of a decision-making base station for the implementation of certain steps of the handover method according to the invention.

DESCRIPTION OF ONE EMBODIMENT OF THE INVENTION

The tree structure of an IAB system is illustrated by FIGS. 6 and 8, which have already been described. The IAB access system comprises a framework of interconnections in a tree structure made up of wireless links and of a single wired link. The wired link connects only one of the base stations, known as the donor node D-BS, of the access system to the core network. The interconnections between the base stations of the access system are based solely on wireless links.

According to the invention, all the nodes of the IAB access system know the topology of the IAB system, i.e. they know the tree structure and the identifier of each of the nodes of this structure. According to the invention, the edge nodes are identified and known. A parent node common to nodes of one or more lower levels that are not directly interconnected by a wireless link (edge nodes) can act as a decision-making node. All the parent nodes which can be decision-making nodes store or have access to a memory space where handover agreement messages are stored, each of said messages being specific to a target base station, i.e. corresponding to the identifier of the target base station.

Certain resources, more particularly of the edge nodes, must be reserved for the implementation of the handover; they cannot be used for any other purpose. These resources comprise time-frequency resources for the RACH channel, possibly a dedicated preamble for access to the RACH channel and a C-RNTI identifier. Since the topology is known to each of the nodes, each parent node stores at least the connection context information, UE context, for the users covered by its edge descendants, i.e. edge base station (the user is within the range of an edge station and is connected to that station).

FIG. 9 illustrates a handover method according to the invention in the context of an IAB system illustrated by FIG. 8.

The handover method 1 according to the invention takes place between base stations of the IAB access system. The method comprises:

transmission, by a base station known as the source base station S-BS of the access system, to which base station a terminal UE is attached, of a handover request, HO req, to a base station known as the target base station T-BS of the access system.

In a known manner, this request is triggered on the basis of measurements, Meas report, reported by the terminal UE.

The handover request, HO req, comprises an identifier of the source and target base stations, respectively, and an identifier of the terminal.

When the source base station S-BS and target base station T-BS are not directly interconnected by a wireless link but are interconnected via at least one base station known as the decision-making node, which is different from the donor node, the method comprises:

interception of the handover request, HO req, by the decision-making node P3-BS.

In the tree structure, the decision-making node P3-BS is the first parent node common to both the source and target base stations. The decision-making node may not be separated by any level, or may be separated by at least one level, from the source and target base stations. The number of levels between the decision-making node and the source base station may be different from the number of levels between the decision-making node and the target base station. A parent node of the source base station which is not a parent node of the target base station transmits the handover request to a higher level, i.e. toward the decision-making node. On the basis of the knowledge of the tree structure and the knowledge of the identifier of the target base station included in the received handover request, the node determines whether it is the decision-making node. If it is the decision-making node, it intercepts the handover request i.e. it does not transmit it to any other node. Thus, the request is processed by the decision-making node P3-BS and there is no need to wait for this request to be transmitted to the target base station for it to be acknowledged.

The method further comprises:

transmission, by the decision-making node P3-BS, of a determined agreement message, HO Ack, to the source base station S-BS.

The decision-making node P3-BS identifies the determined agreement message by querying the list of agreement messages on the basis of the identifier of the target base station included in the handover request, HO req.

The method further comprises:

transmission of a handover trigger message, HO trigger, to the target base station T-BS.

Thus, the decision-making node P3-BS has made a decision about the handover in place of the target base station T-BS. The latency of the method is at least reduced by the elimination of the hops between the decision-making node and the target base station in one direction for the handover request and in the other direction for the agreement message, as illustrated by FIG. 10. The eliminated hops are identified by a cross.

According to a mechanism similar to the method of the prior art, the decision-making node suspends the sending of data to the terminal UE and stores them temporarily as soon as it has received the handover request. After having transmitted the handover trigger message to the target base station, the decision-making node can transmit the temporarily stored data, UE payload, to the target base station.

The simplified structure of a decision-making base station involved in the implementation of a handover method according to the embodiments described above is described below and illustrated by FIG. 11.

Such a base station P3-BS comprises a wireless connection interface X2 IAB, a memory Mem comprising a buffer memory, and a processor μP controlled by a computer program Pg that implements steps of the handover method according to the invention.

The memory Mem stores the tree structure of the topology of the IAB access system for which the base station P3-BS is intended.

The memory Mem furthermore stores a list of determined agreement messages identified respectively with identifiers of the base stations of the IAB access system.

The wireless connection interface X2 IAB makes it possible to receive messages transmitted from another base station of the access system and to transmit messages to another base station of the access system.

On initialization, the code instructions of the computer program Pg are for example loaded into the buffer memory before being executed by the processor μP.

The processor μP intercepts a handover request received on the wireless connection interface X2 IAB. This request is transmitted by a base station known as the source base station of the access system, to which base station a terminal is attached, and is destined for a base station known as the target base station of the access system. The request comprises an identifier of the source and target base stations, respectively, and an identifier of the terminal.

The processor μP implements some of the steps of the handover method described above, according to the instructions of the computer program Pg.

To this end, the processor μP controls the memory Mem in order to transmit, via the wireless connection interface X2 IAB, a determined agreement message to the source base station. The processor μP also controls the memory Mem in order to transmit, via the wireless connection interface X2 IAB, a handover trigger message to the target base station.

The invention claimed is:

1. A handover method comprising:

handover of a terminal between base stations known as nodes, which are identified by an identifier, of an access system for access to a core network, the access system comprising a framework of interconnections in a tree structure of parent and child base stations nodes comprising wireless links and a single wired link, the wired link connecting only one of the base stations of the tree structure to the core network, this station being known as a donor node, the interconnections between the base stations of the access system being based solely on wireless links, the tree structure and the identifier of the nodes of this structure defining a topology of the access system, each node knowing the topology, and wherein the handover comprises:

transmission, by a base station known as a source base station of the tree structure, to which base station the terminal is attached, of a handover request to a base station known as a target base station of the tree structure, the request comprising the identifier of the source and target base stations, respectively, and an identifier of the terminal, the source and target base stations being interconnected via a first common parent base station in the topology, known as a decision-making node, which is located in the topology between the donor node and the source and target base stations and which is different from the donor node, for the handover of the terminal from the source base station to the target base station, interception of the handover request by the decision-making node, and the decision-making node deciding to agree to the handover based on the intercepted handover request and in response:

transmission by the decision-making node of a determined agreement message, for the target base station, to the source base station, and transmission, by the decision-making node, of a handover trigger message to the target base station.

2. The handover method as claimed in claim 1, comprising identification, by the decision-making node, of the determined agreement message by querying a list of agreement messages on the basis of the identifier of the target base station included in the handover request.

3. The handover method as claimed in claim 1, according to which the decision-making node transfers, to the target base station, data from the core network that are destined for the terminal and have not yet been transmitted to the source base station.

4. A base station for an access system for access to a core network, the access system comprising base stations known as nodes, which are identified by an identifier, and comprising a framework of interconnections in a tree structure of parent and child base stations nodes comprising wireless links and a single wired link, the wired link connecting only one of the base stations of the tree structure to the core network, this station being known as a donor node, the interconnections between the base stations of the access system being based solely on wireless links, the tree structure and the identifier of the nodes of this structure defining a topology of the access system, each node knowing the topology, wherein the base station comprises:

a wireless connection interface for receiving and transmitting messages transmitted respectively from and to another base station of the access system, a memory for storing the tree structure, a memory for storing a list of determined agreement messages identified respectively with the identifiers of the base stations, a processor, which is configured to:

receive a handover request on the wireless connection interface and transmitted by another base station known as a source base station of the tree structure, to which a terminal is attached, to a further base station known as a target base station of the tree structure, the request comprising the identifier of the source and target base stations, respectively, and an identifier of the terminal, for a handover of the terminal from the source base station to the target base station, in response to receiving the handover request and the base station being a first common parent of both the source and target base stations in the topology:

control the memory in order to transmit via the wireless connection interface a determined agreement message, for the target base station, to the source base station, and control the memory in order to transmit via the wireless connection interface a handover trigger message to the target base station.

5. The handover method according to claim 1, further comprising in response to the first common parent base station to the source and target base stations receiving the handover request:

the first common parent base station determining, based on the knowledge of the topology and the identifier of the target base station included in the handover request, that the first common parent base station is the decision-making node.

6. The handover method according to claim 1, wherein interception of the handover request by the decision-making node comprises the decision-making node not transmitting the handover request to any other node, including the target base station.

7. A handover method performed during a handover of a terminal between base stations known as nodes, which are identified by an identifier, of an access system for access to a core network, the access system comprising a framework of interconnections in a tree structure of parent and child base stations nodes comprising wireless links and a single wired link, the wired link connecting only one of the base stations of the tree structure to the core network, this station being known as a donor node, the interconnections between the base stations of the access system being based solely on wireless links, the tree structure and the identifier of the nodes of this structure defining a topology of the access system, each node knowing the topology, and wherein the method is performed by a decision-making node of the tree structure and comprises:

receiving a handover request transmitted by a base station known as a source base station of the tree structure, to which base station the terminal is attached, to a base station known as a target base station of the tree structure, the request comprising the identifier of the source and target base stations, respectively, and an identifier of the terminal, the source and target base stations being interconnected by the decision-making node, which is a first common parent base station to the source and target base stations in the topology, wherein the decision-making node is located in the topology between the donor node and the source and target base stations and is different from the donor node, intercepting the handover request, and deciding to agree to the handover based on the intercepted handover request and in response:

transmitting a determined agreement message, for the target base station, to the source base station, and transmitting a handover trigger message to the target base station.

8. The handover method according to claim 7, further comprising in response to the first common parent base station to the source and target base stations receiving the handover request:

the first common parent base station determining, based on the knowledge of the topology and the identifier of the target base station included in the handover request, that the first common parent base station is the decision-making node.

9. The handover method according to claim 7, wherein intercepting the handover request by the decision-making node comprises the decision-making node not transmitting the handover request to any other node, including the target base station.

* * * * *